United States Patent

Baisley (12)

(10) Patent No.: US 6,502,112 B1
(45) Date of Patent: Dec. 31, 2002

(54) METHOD IN A COMPUTING SYSTEM FOR COMPARING XMI-BASED XML DOCUMENTS FOR IDENTICAL CONTENTS

(75) Inventor: Donald Edward Baisley, Laguna Hills, CA (US)

(73) Assignee: Unisys Corporation, Blue Bell, PA (US)

( * ) Notice: Subject to any disclaimer, the term of this patent is extended or adjusted under 35 U.S.C. 154(b) by 0 days.

(21) Appl. No.: 09/384,690

(22) Filed: Aug. 27, 1999

(51) Int. Cl.[7] ............................................... G06F 17/27
(52) U.S. Cl. ........................ 707/513; 707/203; 707/511; 707/514; 717/143; 717/144
(58) Field of Search ................................ 707/511, 513, 707/514, 516, 203; 717/37, 104, 105, 114, 143, 144

(56) References Cited

U.S. PATENT DOCUMENTS

| | | | | |
|---|---|---|---|---|
| 4,807,182 A | * | 2/1989 | Queen | ........................ 345/781 |
| 5,956,726 A | * | 9/1999 | Aoyama et al. | ............. 345/700 |
| 6,098,071 A | * | 8/2000 | Aoyama et al. | ................ 707/1 |
| 6,119,124 A | * | 9/2000 | Broder et al. | ........... 707/103 R |
| 6,343,265 B1 | * | 1/2002 | Glebov et al. | ................ 703/25 |
| 6,407,753 B1 | * | 6/2002 | Budinsky et al. | ........... 345/704 |
| 6,446,081 B1 | * | 9/2002 | Preston | ........................... 704/9 |

* cited by examiner

Primary Examiner—Heather R. Herndon
Assistant Examiner—Charles A. Bieneman
(74) Attorney, Agent, or Firm—Phuong-Quan Hoang; Alfred W. Kozak; Mark T. Starr (57) ABSTRACT

A method is provided by a computer system processing XMI-based XML documents. The method compares two such XMI-based XML documents for identical content. The method begins with the step of parsing each of the documents to create for each a semantic graph of the document's objects. Next, a list of names of properties for each of the objects having significant order is read. For each of the objects, and then for each object's property not listed as having significant order, values of said properties are sorted. Finally, the objects of the semantic graphs are compared.

46 Claims, 9 Drawing Sheets

METHOD IN A COMPUTING SYSTEM FOR COMPARING XMI-BASED XML DOCUMENTS FOR IDENTICAL CONTENTS

A portion of the disclosure of this patent document contains material that is subject to copyright protection. The copyright owner has no objection to the facsimile reproduction by anyone of the patent disclosure, as it appears in the Patent and Trademark Office patent files or records, but otherwise reserves all copyright rights whatsoever.

FIELD OF THE INVENTION

The present invention generally relates to the field of object-oriented computer programs and in particular to a system and method for comparing XMI-based XML documents for identical contents.

BACKGROUND OF THE INVENTION

Extensible Markup Language (XML) is a new format designed to bring structured information to the Web. It is a Web-based language for electronic data interchange. XML is an open technology standard of the World Wide Web Consortium (W3C), which is the standards group responsible for maintaining and advancing HTML and other Web-related standards.

XML is a sub-set of SGML, which maintains the architectural aspects of contextual separation while removing non-essential features. The XML document format embeds content within tags that express the structure. XML also provides the ability to express rules for the structure (i.e., grammar) of a document. These two features allow automatic separation of data and metadata, and allow generic tools to validate an XML document against its grammar.

XML Metadata Interchange (XMI) combines the extensibility of XML with the object modeling power of the Unified Modeling Language (UML) and the Meta Object Facility (MOF) to provide a model-driven framework for sharing complex information.

The purpose of XMI is to make it possible for different tools, applications and repositories on a variety of platforms and middleware to meaningfully share metadata and data. XMI is already being used to share modeling and programming metadata, and its use is expanding into other fields like data warehousing, component management, business objects, and various application domains.

Three complementary standards (XML, UML and MOF), which were brought together by XMI, may be summarized as follows:

a) Extensible Markup Language (XML):
XML is a language used as a foundation for creating specific types of documents. Each type of document has a Document Type Definition (DTD) that describes the structure and element types used in a document. The DTD is used to validate documents of that type.

Popular web browsers now include a built-in XML parser since XML is becoming a dominant way to pass information across the web. Note that XML is not limited to the web—it can be used wherever files or streams are supported.

XML has gained wide acceptance quickly. Over 40 books about XML were published in less than a year after XML became a standard. XML is already supported by tools from numerous vendors: Adobe, Arbor Text, DSTC, HP, IBM, Microsoft, Netscape, Oracle, Platinum, Select, Sun, Unisys and Xerox. Moreover, XML is used in several applications such as publishing, repositories, modeling, database design, data warehousing, services, financial data interchange, health care, and more. Each application has its own document type and corresponding DTD.

b) Unified Modeling Language (EML):
The UML is a notation for object-oriented analysis and design supported by graphical design tools. UML models are used in many domains to describe object-oriented systems. UML models are often used to generate programming language syntax or database schemata. XMI defines how UML models can further be used to generate XML document types.

c) Metaobject Facility (MOF):
The MOF is an extensible framework for models of metadata, providing model-based interfaces for storing and accessing metadata managed by repositories or other tools. The MOF maps core UML concepts, like Class and Association, to specific object interfaces.

The MOF specification defines two levels of object interfaces for creating and accessing the modeled information. First, the MOF defines a single reflective interface that can be used for all types of models. Second, the MOF defines a pattern for generating specific interfaces for individual models. The generation pattern is now standardized for CORBA IDL, a Java pattern is coming, and other object languages are expected to follow.

XMI Brings XML, UML and MOF Together:
XMI adds an XML stream-based interchange capability to the two levels of object interfaces. The XMI specification defines the pattern for turning a model into a DTD and for turning modeled data into XML.

The XMI Specification defines how a model in a MOF system is translated into an XML document type (DTD) and how modeled objects are translated to and from XML. UML is the starting point where object-oriented discipline and rigor are applied to defining a model. MOF rules then define the resulting interfaces to documents defined by the model. The XMI specification defines the XML document type.

In the prior art, it is a tedious and time consuming task to compare XMI-based XML documents for identical content. Prior art techniques use a method based upon comparison of textual content. These techniques are incapable of returning as identical two documents that are semantically identical but are arranged in a different order. Instead, when order is not significant, they return semantically identical documents as unequal along with semantically un-identical ones. Thus, the user has to manually sift through all documents returned as unequal to identify documents that are semantically identical but have a different order. This is a highly time consuming and tedious task when a large number of XMI-based XML documents need to be processed. Accordingly, there is a need for automatically comparing XMI based documents for identical content.

An associated problem with prior art techniques is that current methods fail to ignore differences in internal identifier values. Thus, semantically identical documents arranged in the same order but with different XMI internal identifier values are returned as unequal when using current methods of comparison.

Another problem with prior art techniques for comparing XML documents is that currently, comparison methods must be customized or changed for individual document types. This is because these comparison methods are highly context specific and need to be told what kind of comparisons to expect.

SUMMARY OF THE INVENTION

As will be amplified in greater detail hereinbelow, the present invention solves one of the prior art problems by creating a semantic graph of all documents before applying the comparison algorithm, which helps to standardize all XML documents to a common standard semantic graph based format that the comparison algorithm is capable of processing.

Accordingly, it is an object of the present invention to provide a system and method for comparing a semantic graph encoded in documents rather than comparing textual content as in current XML comparison methods.

Another object of the present invention is to provide a system and method for comparing documents that considers order only where order is significant.

Yet another object of the present invention is to provide a system and method for comparing documents that ignores differences in internal identifiers (e.g., xmi.id values).

Still another object of the present invention is to provide a universal system and method for comparing XML documents that works for any XMI-based document type.

These and other objects, which will become apparent as the invention is described in detail below, wherein a method is provided by a computer system processing XMI-based XML documents. The method compares two such XMI-based XML documents for identical content. The method begins with the step of parsing each of the documents to create for each a semantic graph of the document's objects. Next, a list of names of properties for each of the objects having significant order is read. For each of the objects, and then for each object's property not listed as having significant order, values of said properties are sorted. Finally, the objects of the semantic graphs are compared.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive, and what is intended to be protected by Letters Patent is set forth in the appended claims. The present invention will become apparent when taken in conjunction with the following description and attached drawings, wherein like characters indicate like parts, and which drawings form a part of this application.

DETAILED DESCRIPTION OF ONE EMBODIMENT

Before proceeding with a description of the system and method of the present invention, a summary of Terminology used herein is provided, which may be helpful in understanding the disclosed embodiment.

An object is an abstract representation of a real-world concept or thing. For example, an object can be used to represent a customer account in a banking application. An object has features, which can be either an operation or a property. An operation defines an action that an object can perform, or an action that can be performed on the object. For example, "make withdrawal" could be defined as an operation on a customer account object. Properties indicate the state of an object. Every property of an object has a value, and it is the property values that define the state of the object. A property can be either an attribute or a reference. An attribute defines a value that is stored within the object. For example, "current account balance" could be an attribute of the customer account object. The numeric value for the customer's account balance would be stored in the customer account object. A reference is a link or pointer to another object, and implies a relationship to that other object. A reference is typically used when it is desired not to duplicate data. For example, the customer account object could store the customer's name and address as attributes. However, if the customer opened multiple accounts, the customer's name and address would appear in multiple account objects. Therefore, it is desirable to define a separate customer object and place the name and address as attributes of the customer object. The customer account object would then contain a reference to the customer object.

Figure 1:
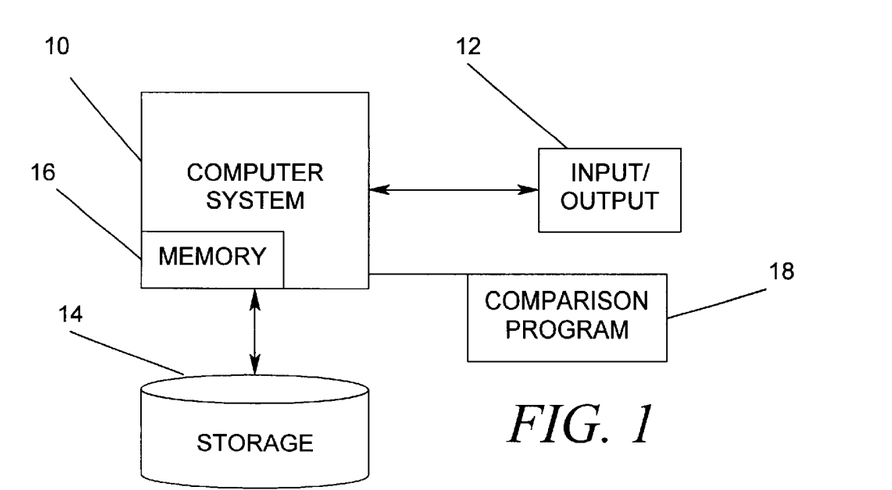
FIG. 1 is a block diagram of a system that may employ the method of the present invention.

Referring now to the drawings and FIG. 1 in particular, a computer system capable of executing the method of the present invention is shown. A computer system 10 includes an input/output device 12 (such as a computer monitor and keyboard) a storage device 14 (such as a disk drive) and a memory 16. The memory 16 is capable of storing data and computer programs, such as the comparison program 18 of the present invention. When the system 10 executes the program 18, two XML documents are compared as illustrated in FIG. 2.

Figure 2:
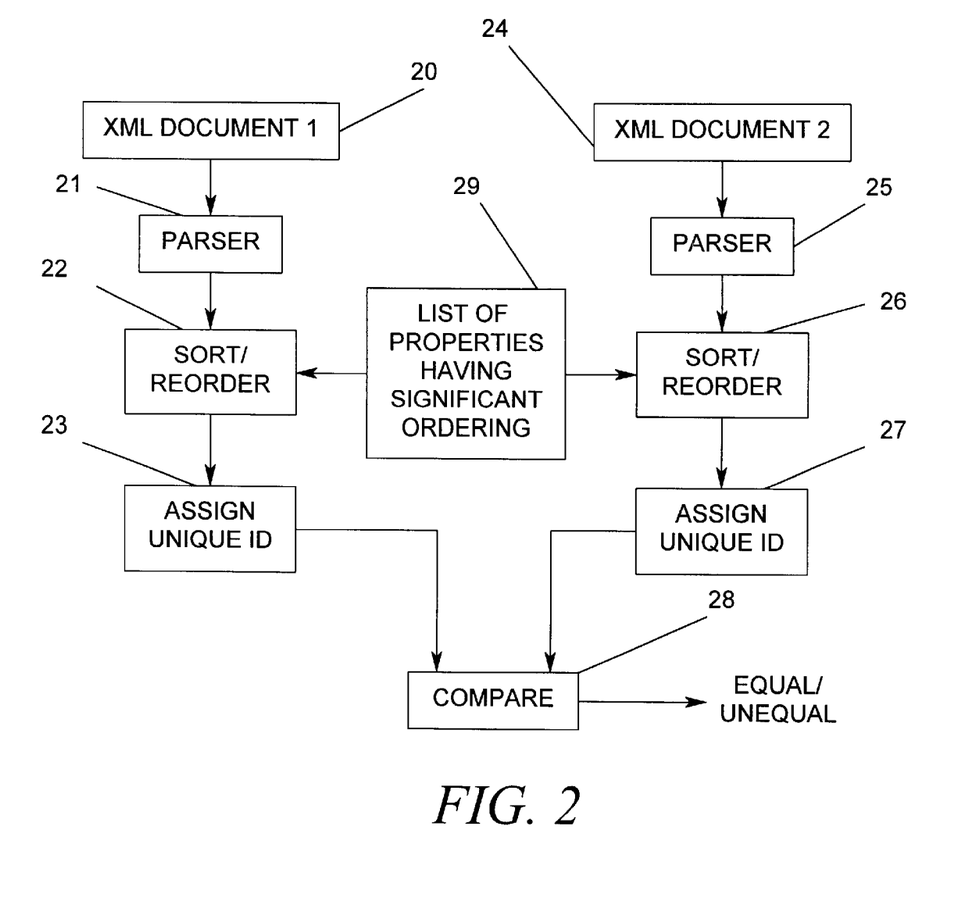
FIG. 2 is a module block diagram of the system and method of the present invention.

Referring now to FIG. 2, a modular/functional diagram of the present invention is shown. A first XML document 20 (XML DOCUMENT 1) is parsed by a parser 21 to create a graph of its objects. Each object's properties are then sorted by a sorter/reorder module 22 which is controlled by a list of properties having significant ordering module 29 and then each object is assigned a unique identification by an assign unique ID module 23. In a similar manner, a second XML document 24 (XML DOCUMENT 2) is parsed by a parser 25 to create a graph of its objects. Each object's properties are then sorted by a sort/reorder module 26 which is controlled by a list of properties having significant ordering module 29 before each object is assigned a unique ID by a module 27. The documents are then compared by a compare module 28.

The result of the compare operation (module 28) is provided as an output signifying that the documents are equal or unequal. These modules and the steps of the process will become clearer from a description hereinbelow when taken in conjunction with the drawings.

A sample XML document is set forth below in Table I, which illustrates the concept of objects in an XML document that can be identified by XMI identifiers; and, that are arranged in a specific order within the document. For example, the document 1 in Table I below has four objects identified by the XMI identifiers "a1" "a2", "a3" and "a4". These objects are arranged in an order a1-a2-a3-a4 within the document.

Table II below is another XML document with the XMI identifiers "b6", b7", "b8" and "b9". The order in which they are arranged in the document is b9-b6-b7-b8. The purpose of showing the second document is to illustrate that on careful examination it will be noticed that the two documents are semantically identical. That is, there is a one to one correspondence between the objects in the two documents. For example, object a1 in document 1 is semantically identical with object b9 in document 2. Similarly, objects a2 and b8, objects a3 and b7 and objects a4 and b6 are all semantically identical pairs.

However, it will also be noticed that these semantically identical objects are located in a different order in the two documents. A comparison tool from prior art that is used to compare these two XML documents would return them unequal although semantically the two documents are identical. Hence, this invention will provide a tool that will automatically identify these two documents to be semantically identical and return them as equal. Such a tool will consider order only when it is significant, otherwise it will ignore order of the objects in a document and will compare the documents based on a semantic graph developed for each document.

TABLE I

XML Document 1
```
<?xml version = '1.0' encoding = 'ISO-8859-1' ?>
<XMI xmi.version='1.0'>
    <XMI.header>
        <XMI.metamodel xmi.name='TestModel' xmi.version='0'/>
    </XMI.header>
    <XMI.content>
        <Pkg xmi.id='a1'>
            <Pkg.name>P</Pkg.name>
            <Pkg.content>
                <X xmi.id='a2'>
                    <X.name>John</X.name>
                    <X.phone>555–9876</X.phone>
                </X>
                <X xmi.id='a3'>
                    <X.name>George</X.name>
                    <X.phone>555–5432</X.phone>
                    <X.phone>555–4321</X.phone>
                </X>
                <Y xmi.id='a4'>
                    <Y.contact>
                        <X xmi.idref='a3'/>
                        <X xmi.idref='a2'/>
                    </Y.contact>
                </Y>
            </Pkg.content>
        </Pkg>
    </XMI.content>
</XMI>
```

TABLE II

XML Document 2
```
<?xml version = '1.0' encoding = 'ISO-8859-1' ?>
<XMI xmi.version='1.0'>
    <XMI.header>
        <XMI.metamodel xmi.name='TestModel' xmi.version='0'/>
    </XMI.header>
    <XMI.content>
        <Pkg xmi.id='b9'>                      <! Package P >
```

TABLE II-continued

```
        <Pkg.name>P</Pkg.name>
        <Pkg.content>
            <Y xmi.id='b6'>                    <! Contact List >
                <Y.contact>
                    <X xmi.idref='b8'/>        <! --> George >
                    <X xmi.idref='b7'/>        <! --> John >
                </Y.contact>
            </Y>
            <X xmi.id='b7'>                    <! George >
                <X.name>George</X.name>
                <X.phone>555–4321</X.phone>
                <X.phone>555–5432</X.phone>
            </X>
            <X xmi.id='b8'>                    <! John >
                <X.name>John</X.name>
                <X.phone>555–9876</X.phone>
            </X>
        </Pkg.content>
    </Pkg>
    </XMI.content>
</XMI>
```

Figure 3A:
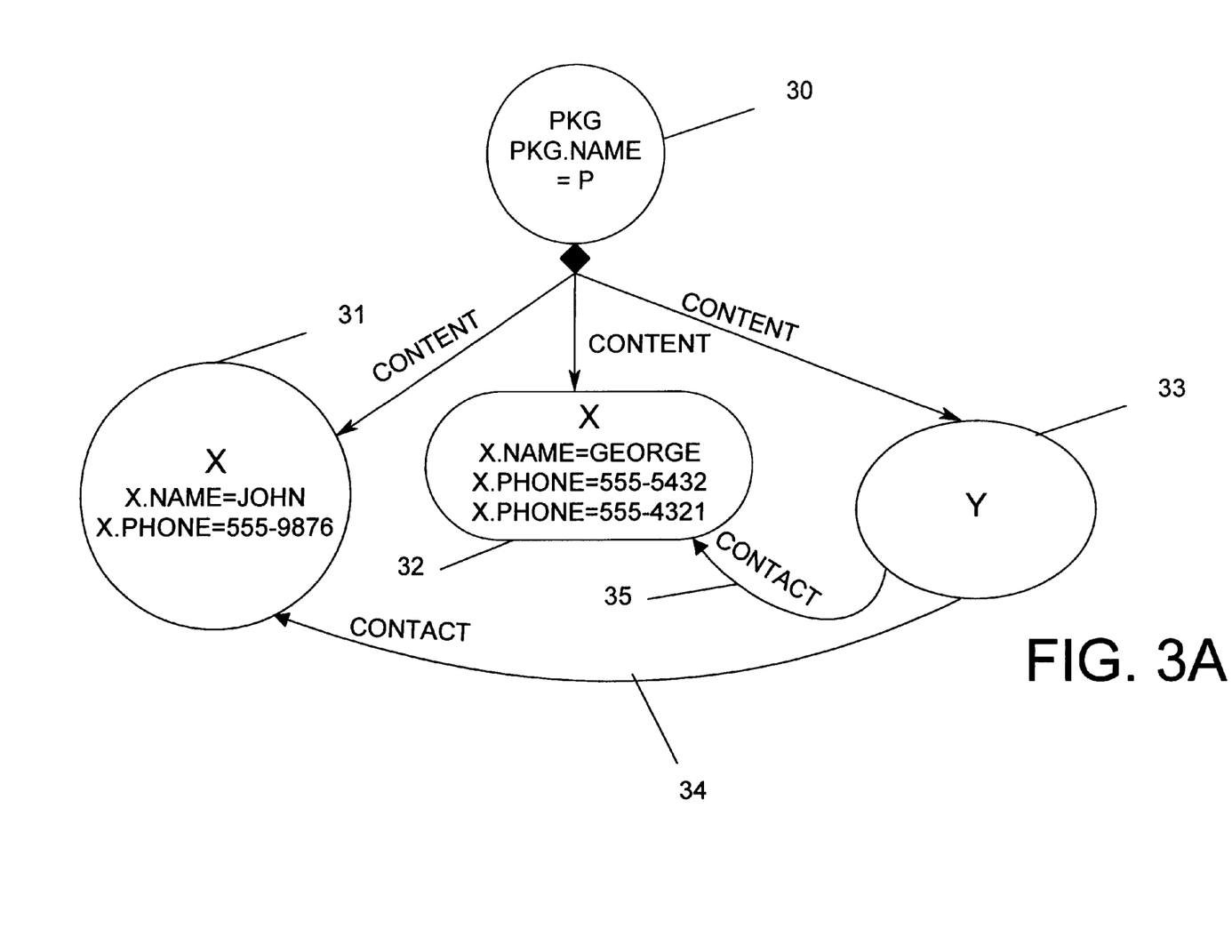
FIGS. 3A through 3D are a series of graphs illustrating the comparison procedure of the present invention.
Figure 3B:
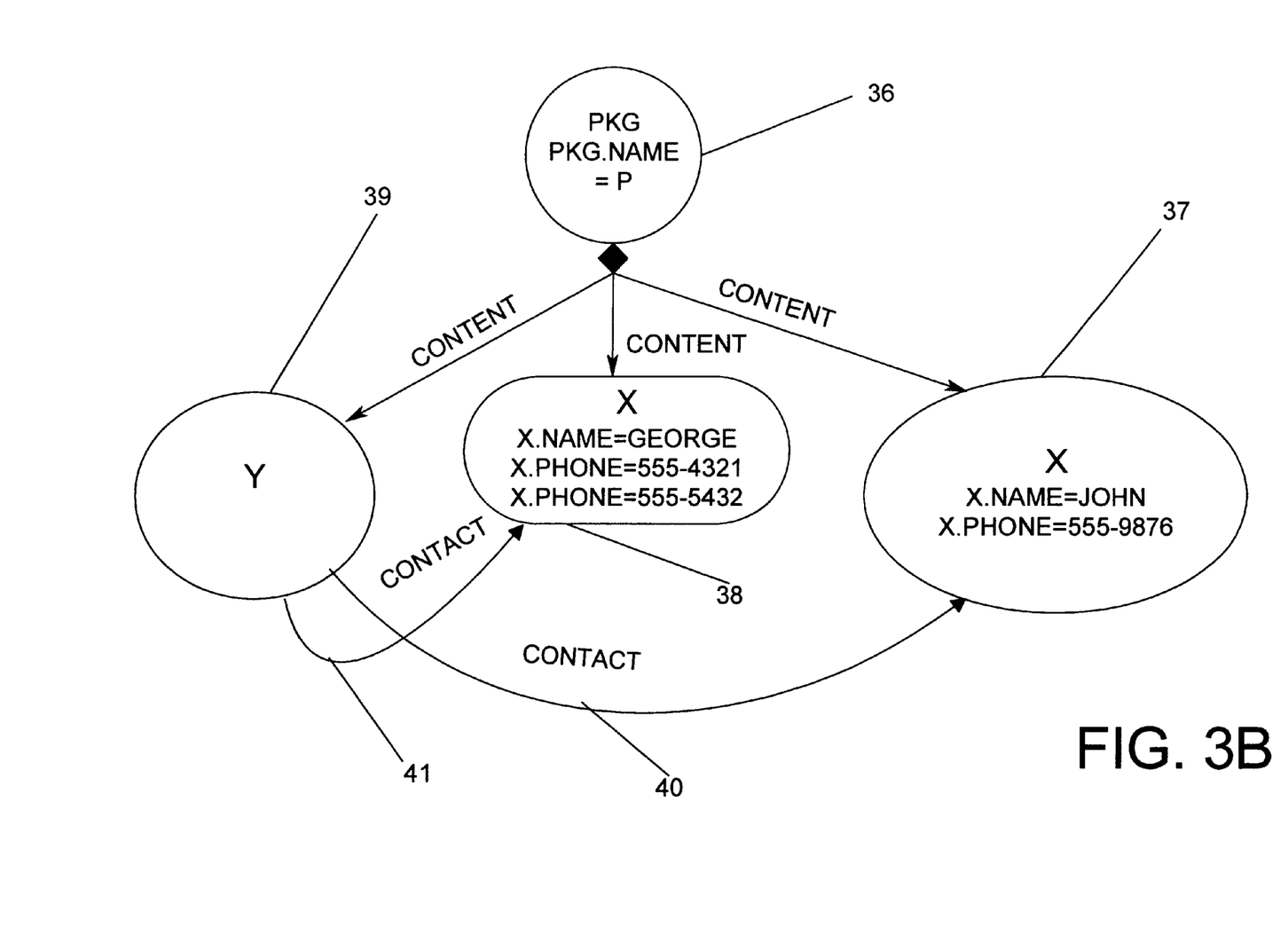

Referring now to FIGS. 3A through 3D, a series of graphs illustrating the comparison procedure of the present invention are shown. FIG. 3A illustrates the graph generated from the document 1 (Table I above) and FIG. 3B illustrates the graph generated from the document 2 (Table II above). In FIG. 3A an object 30 corresponding to XMI identifier a1 is composed of an object 31 with XMI identifier a2, an object 32 with XMI identifier a3 and an object 33 with XMI identifier a4. Also, object 33 references objects 31 and 32 as depicted by arrows 34 and 35, respectively. In FIG. 3B an object 36 with XMI identifier b9 that is composed of an object 37 with XMI identifier b8, an object 38 with XMI identifier b7 and an object 39 with XMI identifier b6. Moreover, the object 39 references the objects 37 and 38 as illustrated by arrows 40 and 41, respectively. Note the order of the arrows 40 and 41 are reversed from the order of the arrows 34 and 35 in FIG. 3A depicting the different order in which these semantically identical objects are referenced within the two documents. Also note that XMI identifiers are excluded from the graphs because they are labels only and are not part of a document's semantic content.

Figure 3C:
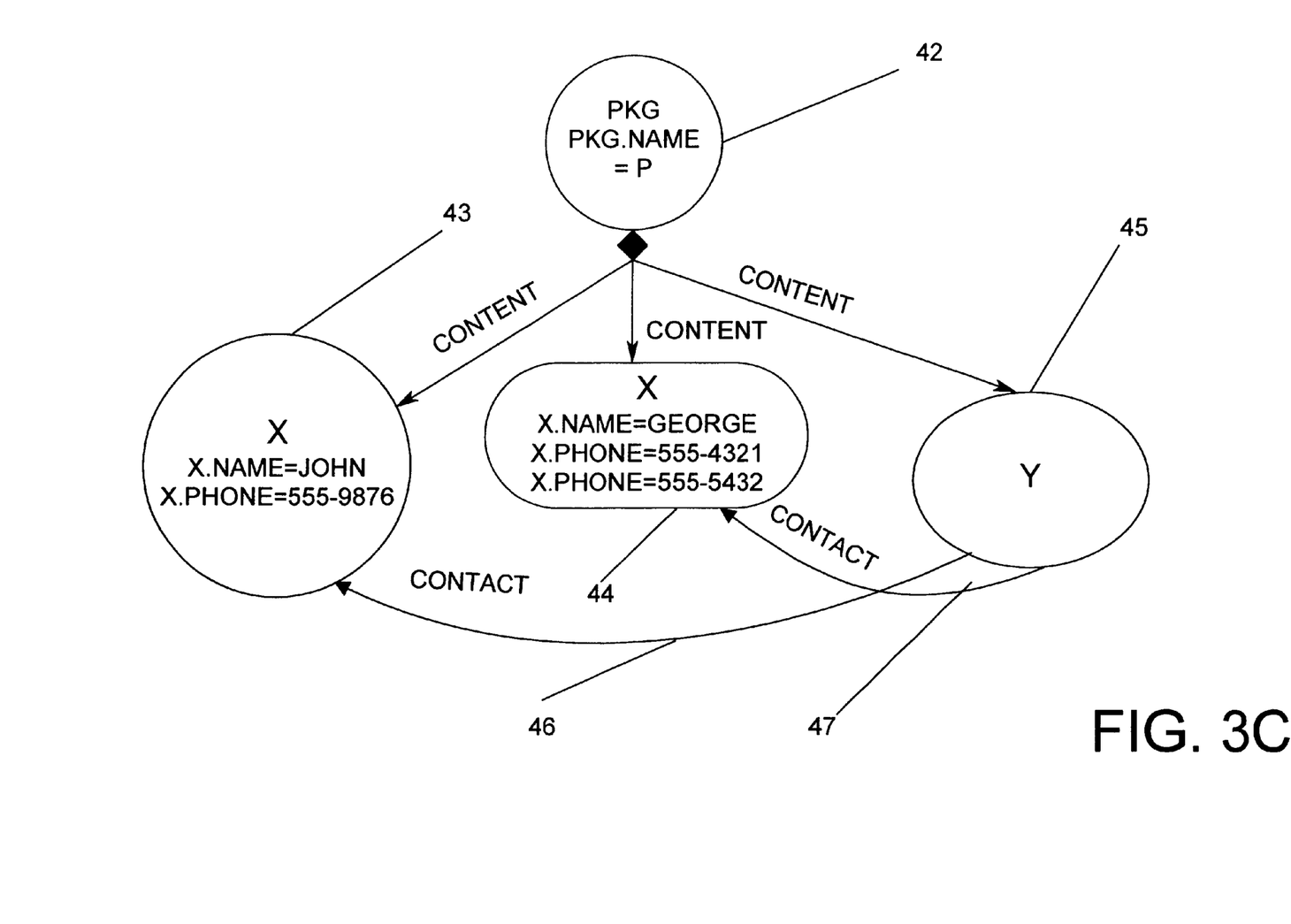

FIG. 3C illustrates the semantic graph resulting from sorting the properties of objects in each of the XML documents based on ordering not being significant for any of the properties. Where the values of a property are object references, objects are sorted using using the following complex sort key:

1. Type of object;
2. Object's number of properties;
3. Property name/value pairs of properties with data values (presorted by data value where adjacent values have the same property name);
4. Composition depth;
5. Composite owner (recursive);
6. Referenced objects of properties specified as having significant order (recursive); and,
7. Referenced objects of properties not specified as having significant order (presorted, limited recursion).

Sorting is done based on a fixed sorting method in order to bring the two documents to a common reference structure for comparing them. This common reference structure resulting from sorting enables a comparison of documents having any structure. In the example presented here, since we chose two documents that were semantically identical, FIG. 3C shows the single resulting semantic graph which represents each document. Thus, with reference to FIG. 3C, object 42 in the semantic graph corresponds to objects in the two documents with XMI identifiers a1 and b9. Object 42 is composed of an object 43, corresponding to objects with XMI identifiers a2 and b8, an object 44 corresponding to objects with XMI identifiers a3 and b7 and an object 45 corresponding to objects with XMI identifiers a4 and b6. The object 45 references the objects 43 and 44, as depicted by arrows 46 and 476, respectively. Note that the semantic graph in FIG. 3C is a sorted version of either of the graphs shown in FIG. 3A or 3B, sorting being done according to the sort key presented above. Also, notice that the phone numbers in the second object 44 (X) in either FIG. 3A or 3B have been sorted in ascending order in the semantic graph in FIG. 3C. The method of sorting data values, ascending or descending, is not important as long as the method is used consistently in the sorting of all the documents being compared.

Figure 3D:
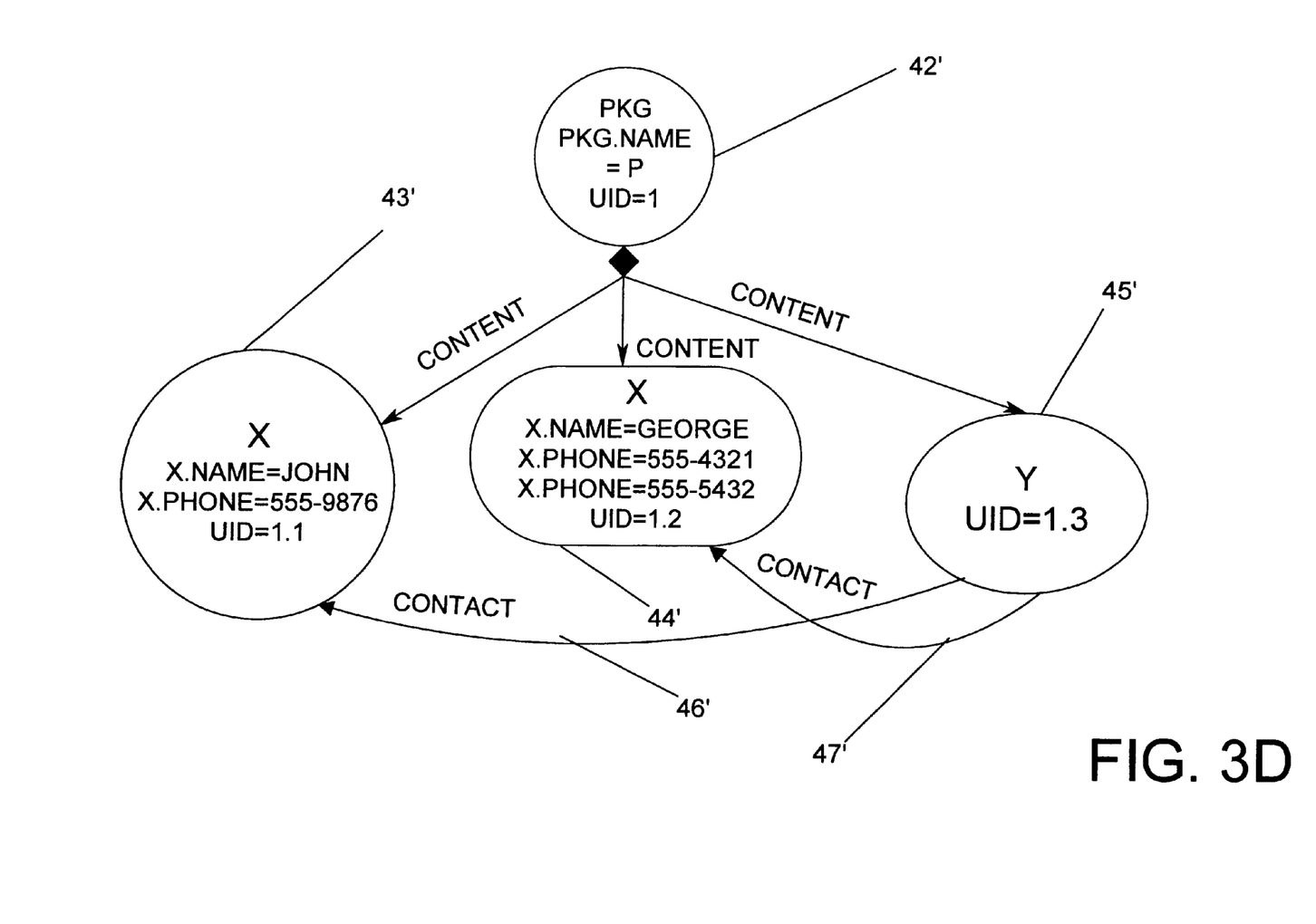

FIG. 3D illustrates the semantic graph resulting by adding unique identification numbers (UID) to the objects of the semantic graph shown in FIG. 3C. The object numbers are labeled the same as shown in FIG. 3C, except that they include a prime to denote a distinction from the graph shown in FIG. 3C. The unique identifiers allow the compare method to uniquely reference objects that are at the same depth from the root object in each graph for comparing them.

Figure 4:
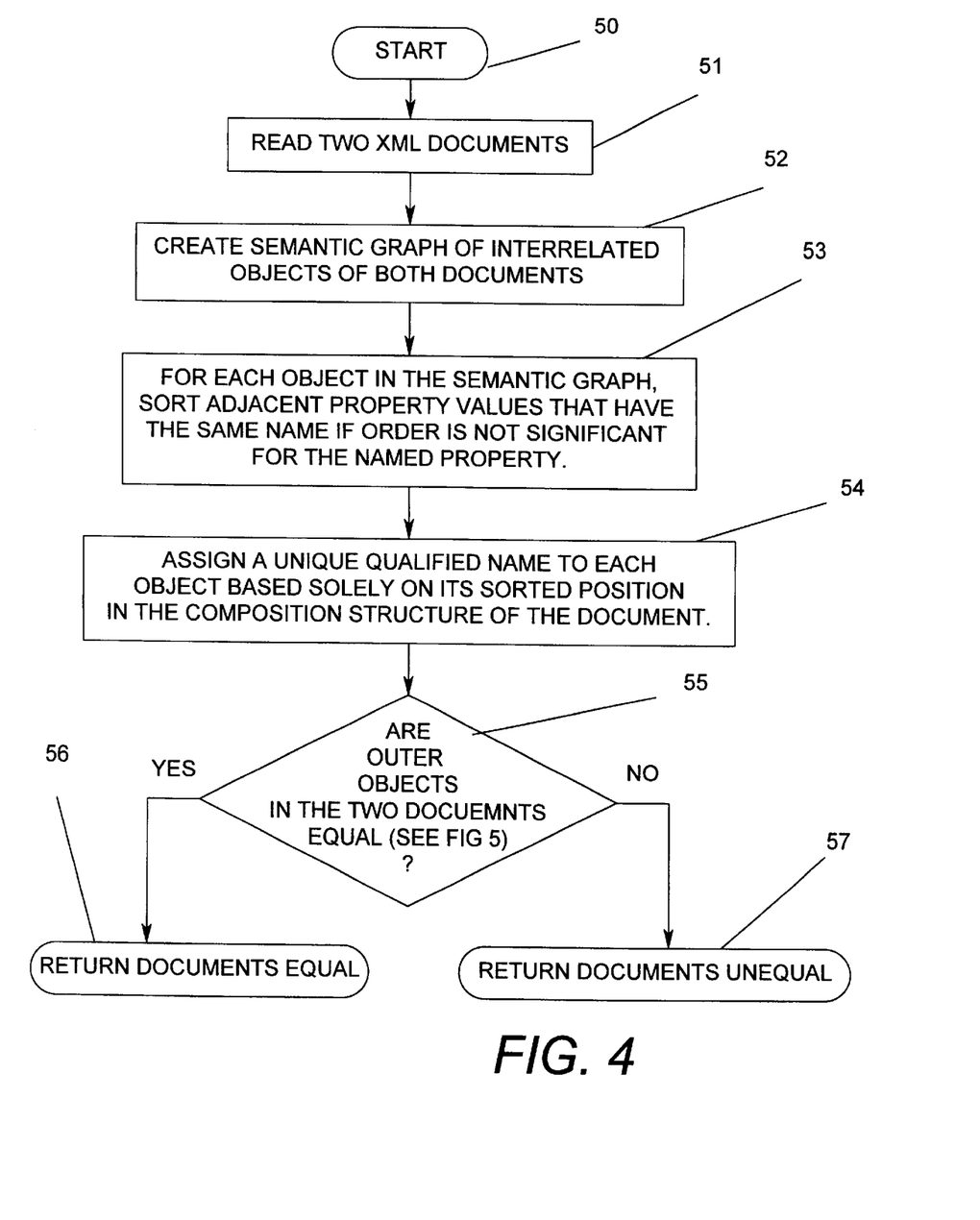
FIG. 4 is a flow chart of the main process of the present invention.

Referring now to FIG. 4, a flow chart of the overall process of the present invention is illustrated. The process begins with a start bubble 50 followed by a step of reading two XML documents (block 51), such as documents 20 and 24 (FIG. 1). Next, a semantic graph of interrelated objects of both documents is created (block 52) in order to provide two XML documents with the same specified format which the compare module can process. This allows comparison of XML documents having any XMI-based document type using this method. The semantic graph is prepared by creating a graph of interrelated objects, one for each object represented in the document and capturing from the document the following information about each object:

1. Name of the object type as an XML tag;
2. A list of properties belonging to the object in the previous step, including:
   (a) Property name as an XML tag;
   (b) The property value, as one of:
      (i) a reference to an object within the same document; and,
      (ii) a data value or an identification of an external object; and,
   (c) Whether or not the property value is a composite; and,
3. the composite owner, if any, of the object.

After this, for each object in the semantic graph, adjacent property values having the same name and having insignificant order are sorted (block 53), The sorting is done so that for all objects in the semantic graph, their property values are arranged in a defined order, which makes those objects suitable for comparison.

Where adjacent property values have the same name and are unordered, if property values are data values or external references, the values are sorted by comparing them directly. If the property values are references to objects, they are sorted by type. If they refer to the same type of object, then sorting is done based upon the referred object's number of properties. If the number of properties is the same, then sorting is based upon the Property name/value pairs of properties with data values. If the property names of the referenced object are the same, then sorting is done based upon composition depth. If even the composition depth is the same then, sorting is done based on referenced objects of the properties specified as having significant order. This comparison happens recursively until either a difference is found or the comparison reencounters the same objects that are already being compared. If even then the initially referenced property values are the same, then sorting is done based upon referenced objects of properties not specified as having significant order. This comparison happens recursively until a difference is found or the comparison encounters the same objects that are being compared.

A unique qualified name is assigned to each object based solely upon its sorted position in the composition structure of the document (block 54). This gives the comparison method a handle to reference the objects according to their position in the sorted semantic graph. As an example, the unique qualified name can be a concatenation of an object's owner's qualified name, a punctuator, and an object's ordinal position of containment, or simply "1" for an unowned object. Next, an inquiry is made as to whether or not the outer objects of the two documents are equal (diamond 55), which is illustrated in greater detail in FIG. 5 and described hereinbelow. If the outer objects are equal, then a return of DOCUMENTS EQUAL is made (bubble 56). On the other hand, if the documents are not equal, then a return of DOCUMENTS UNEQUAL is made (bubble 57).

Figure 5:
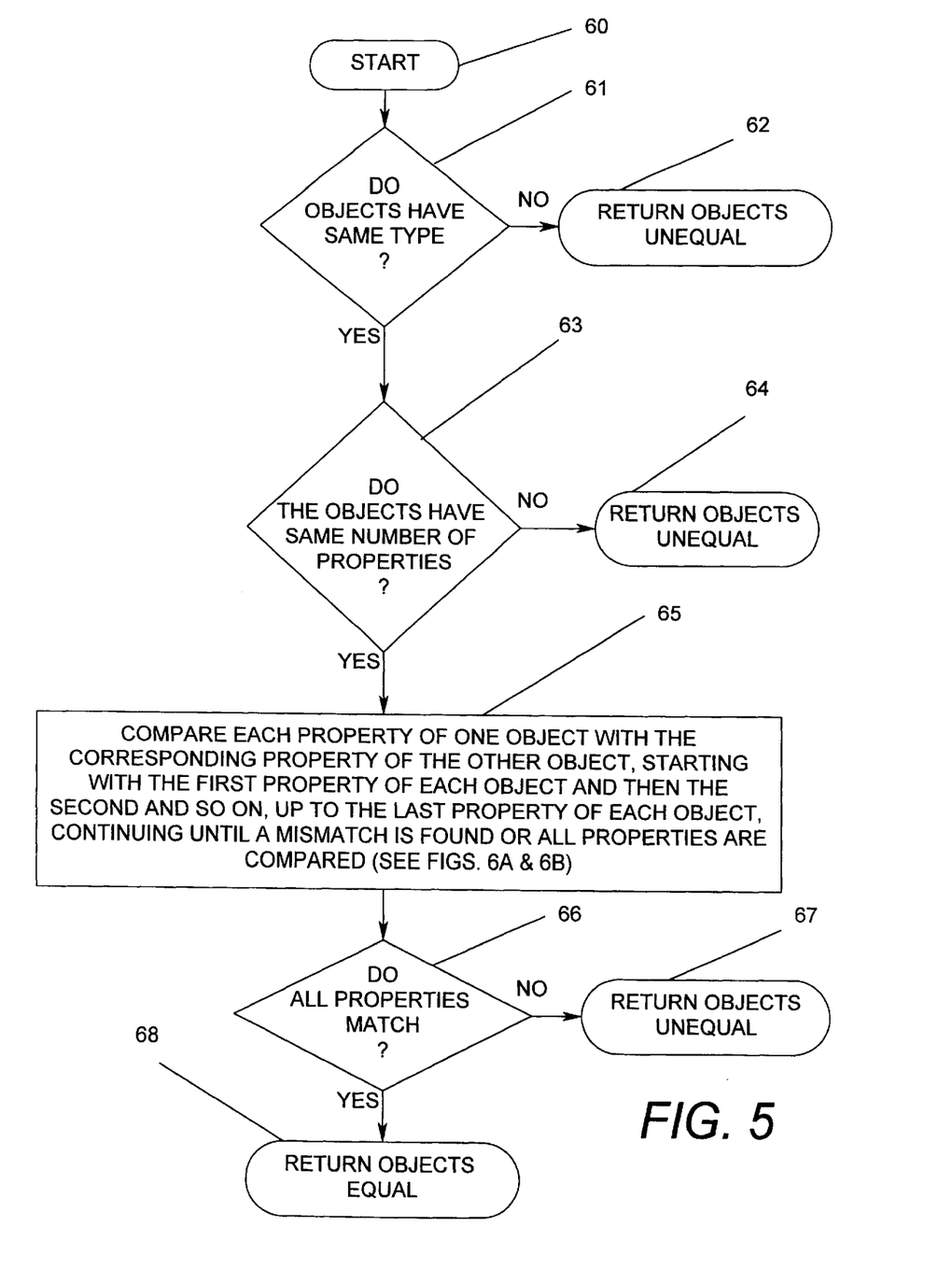
FIG. 5 is a flow chart of a process for comparing corresponding object of the two documents being compared.

Referring now to FIG. 5, a flow chart of the process for comparing corresponding objects of the two documents being compared is shown. The process begins with a start bubble 60 followed by an inquiry as to whether or not objects have the same type (diamond 61). If the answer to this inquiry is no then a return of OBJECTS UNEQUAL is made (bubble 62). On the other hand, if the answer to this inquiry is yes, then another inquiry is made as to whether or not the objects have the same number of properties (diamond 63). If the answer to this inquiry is no, then a return of OBJECTS UNEQUAL is made (bubble 64). On the other hand, if the answer to this inquiry is yes, then each property of one object is compared with the corresponding property of the other object, starting with the first property of each object and then the second and so on; up to the last property of each object, continuing until a mismatch is found or all properties are compared (block 65). This step is illustrated in greater detail in FIGS. 6A and 6B.

Following the above, yet another inquiry is made as to whether or not all properties match (diamond 66). If the answer to this inquiry is no, then a return of OBJECTS UNEQUAL is made (bubble 67). On the other hand, if the answer to this inquiry is yes, then a return of OBJECTS EQUAL is made (bubble 68).

Figure 6A:
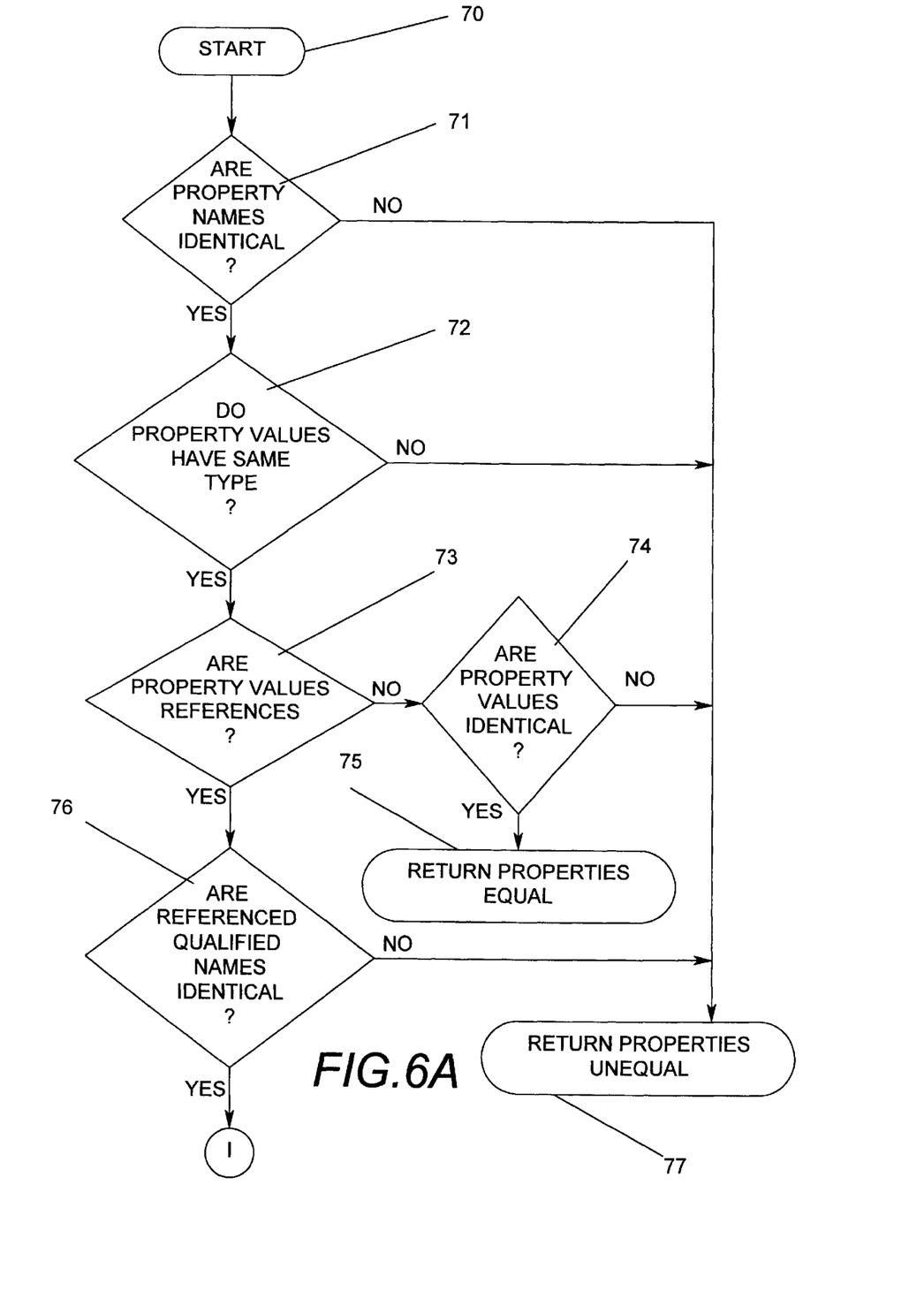
FIGS. 6A and 6B combined form a flow chart of a process for comparing each property of objects from a first document with corresponding properties of corresponding objects from the second document being compared.
Figure 6B:
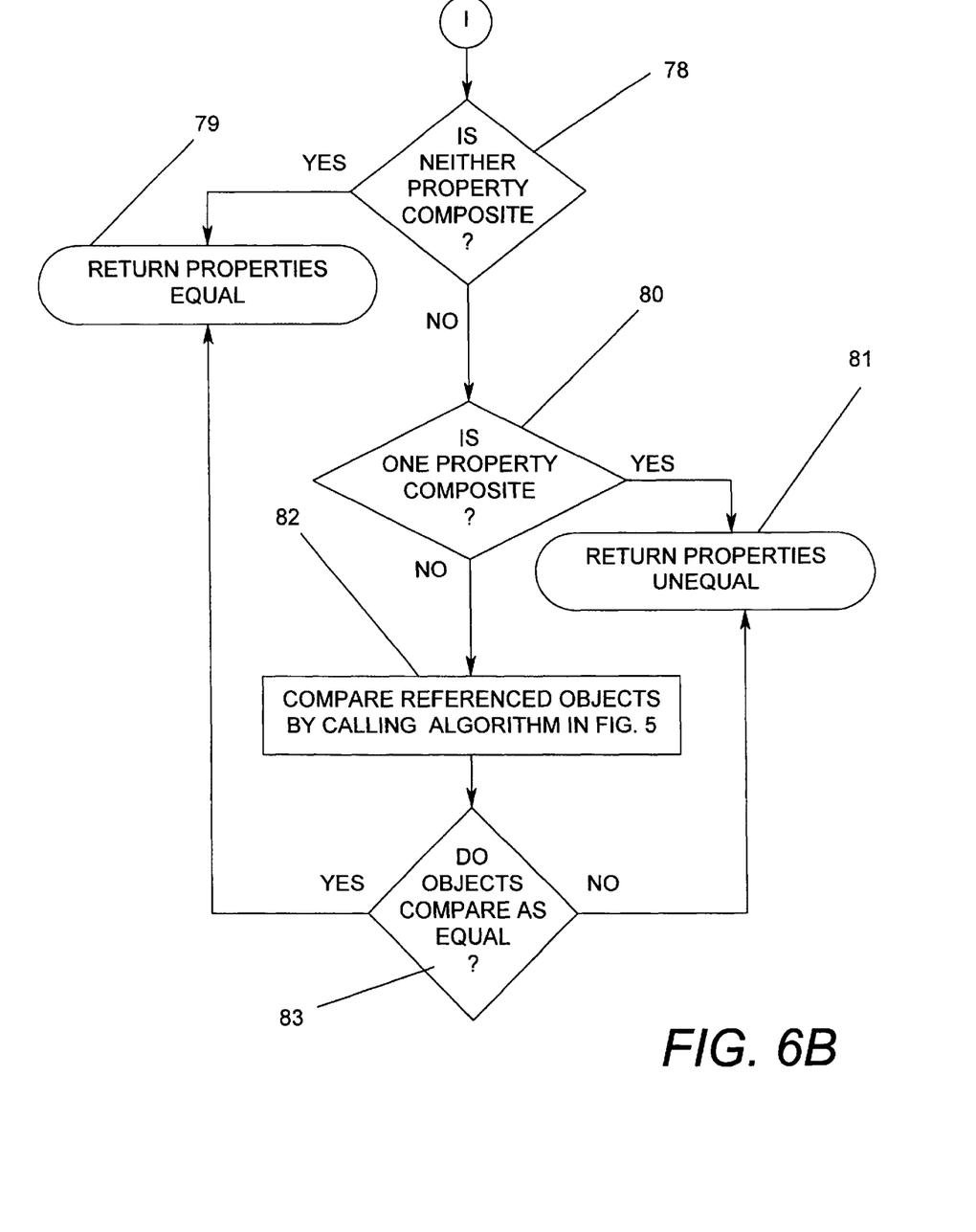

Referring now to FIGS. 6A and 6B, a flow chart of the process for comparing each property of objects from a first document with corresponding properties of corresponding objects from the second document is shown. The process begins with a start bubble 70 followed by an inquiry as to whether or not property names are identical (diamond 71). If the answer to this inquiry is yes, then another inquiry is made as to whether or not property values have the same type (diamond 72). If the answer to this inquiry is yes, then yet another inquiry is made as to whether or not property values are references (diamond 73). If the answer to this inquiry is no, then still another inquiry is made as to whether or not property values are identical (diamond 74). If the answer to this inquiry is yes, then a return of PROPERTIES EQUAL is made (bubble 75).

If the answer to the inquiry in the diamond 73 is yes, then an inquiry is made as to whether or not the referenced qualified names are identical (diamond 76). If the answer to this inquiry is no, or if the answer to the inquiries in any of the diamonds 71, 72 or 74 is no, then a return of PROPERTIES UNEQUAL is made (bubble 77). On the other hand, if the answer to the inquiry in the diamond 76 is yes, then the process illustration continues in FIG. 6B as denoted by a connector I.

Referring now to FIG. 6B at the connector I, another inquiry is made as to whether or not neither property is a composite (diamond 78). If the answer to this inquiry is yes, then a return of PROPERTIES UNEQUAL is made (bubble 79). On the other hand, if the answer to the inquiry in the diamond 78 is no, then still another inquiry is made as to whether or not one property is composite (diamond 80). If the answer to this inquiry is yes, then a return of PROPERTIES UNEQUAL is made (bubble 81). On the other hand, if the answer to the inquiry in the diamond 80 is no, then a comparison is made of the reference objects by calling the algorithm illustrated in FIG. 5 (and described hereinabove) with the names of the referenced objects as parameters (block 82). Next, another inquiry is made as to whether or not the objects compare as equal (diamond 83). If the answer to this inquiry is yes, then a return of PROPERTIES EQUAL is made (bubble 79) or if the answer to this inquiry is no, then a return of PROPERTIES UNEQUAL is made (bubble 81).

The methods and apparatus of the present invention, or certain aspects or portions thereof, may take the form of program code (i.e., instructions) embodied in tangible media, such as floppy diskettes, CD-ROMS, hard drives, or any other machine-readable storage medium, wherein, when the program code is loaded into and executed by a machine, such as a computer, the machine becomes an apparatus for practicing the invention. The methods and apparatus of the present invention may also be embodied in the form of program code that is transmitted over some transmission medium, such as over electrical wiring or cabling, through fiber optics, or via any other form of transmission, wherein, when the program code is received and loaded into and executed by a machine, such as a computer, the machine becomes an apparatus for practicing the invention. When implemented on a general-purpose processor, the program code combines with the processor to provide a unique apparatus that operates analogously to specific logic circuits.

Although the invention has been described with reference to a specific embodiment, this description is not meant to be construed in a limiting sense. Various modifications of the disclosed embodiment as well as alternative embodiments of the invention will become apparent to one skilled in the art upon reference to the description of the invention. It is therefore contemplated that the appended claims will cover any such modifications of embodiments that fall within the true scope of the invention.

What is claimed is:

1. In a computer system for processing XMI-based XML documents, a method for comparing two such documents for identical content, said method comprising the steps of:
    a. parsing each of said documents to create for each a semantic graph of the document's objects;
    b. reading a list of names of properties of said objects having significant order;
    c. for each of said objects, and then for each object's property not listed as having significant order, sorting values of said property; and,
    d. comparing objects of said semantic graphs.

2. The method as in claim 1 wherein said step of sorting values of said property further includes the step of assigning a unique qualified name to each object in each of said semantic graphs.

3. The method as in claim 2 wherein said step of assigning a unique qualified name is based on the sorted position of each object in the composition structure of each of said semantic graphs.

4. The method as in claim 1 wherein said step of comparing objects in said two semantic graphs further includes returning the result of said step of comparing.

5. The method as in claim 1 wherein said step of sorting values of said property not having significant order, further includes the step of sorting said values of said property based on their data value where said value is in fact a data value.

6. The method as in claim 1 wherein said step of sorting values of said property not having significant order further includes the step of sorting said values based on referenced objects where said values are references to objects.

7. The method as in claim 6 wherein said step of sorting values of said property where said values are references to objects further includes sorting based on type of said referenced objects.

8. The method as in claim 6 wherein said step of sorting values of said property where said values are references to objects further includes sorting based on number of properties of said referenced objects.

9. The method as in claim 6 wherein said step of sorting values of said property where said values are references to objects further includes sorting based on the property name/value pairs of properties with data values.

10. The method as in claim 6 wherein said step of sorting values of said property where said values are references to objects further includes sorting based on the composition depth of said referenced objects.

11. The method as in claim 6 wherein said step of sorting values of said property, where said values are references to objects, further includes sorting based on the composite owner of said referenced objects, thereby further sorting said values based on referenced objects, recursively for objects referenced by referenced objects.

12. The method as in claim 6 wherein said step of sorting values of said property, where said values are references to objects, further includes sorting based on referenced objects of properties specified as having significant order, thereby further sorting said values based on referenced objects, recursively for objects referenced by referenced objects.

13. The method as in claim 6 wherein said step of sorting values of said property, where said values are references to objects, further includes sorting based on referenced objects of properties not specified as having significant order, thereby further sorting said values based on referenced objects, recursively for objects referenced by referenced objects.

14. The method as in claim 1 wherein said step of comparing objects of said semantic graphs further comprises the step of determining whether or not said objects are of the same type.

15. The method as in claim 1 wherein said step of comparing objects of said semantic graphs further comprises the step of determining whether or not said objects have the same number of properties.

16. The method as in claim 1 wherein said step of comparing objects of said semantic graphs further comprises comparing each property of the first one of said objects with corresponding property of the second one of said objects.

17. The method as in claim 16 wherein said step of comparing each property of the first one of said objects with corresponding property of the second one of said objects further includes comparing property names.

18. The method as in claim 16 wherein said step of comparing each property of the first one of said objects with corresponding property of the second one of said objects further includes comparing types of property values.

19. The method as in claim 16 wherein said step of comparing each property of the first one of said objects with corresponding property of the second one of said objects further includes, where property values are data values, comparing said data values.

20. The method as in claim 16 wherein said step of comparing each property of the first one of said objects with corresponding property of the second one of said objects further includes, where property values are references to objects, comparing unique qualified names of said referenced objects.

21. The method as in claim 16 wherein said step of comparing each property of the first one of said objects with corresponding property of the second one of said objects further includes, where property values are composite references to objects, comparing said referenced objects thereby repeating step d of claim 1 recursively.

22. The method as in claim 1 wherein said step of comparing objects of said semantic graphs further comprises the step of, where any of said objects compare as unequal, returning an indication that said documents are unequal; and where all of said objects compare as equal, returning an indication that said documents are equal.

23. The method as in claim 1 wherein said step of parsing further comprises capturing the following for each object in each one of said semantic graphs:
  a. type name of said object;
  b. a list of property values in the order occurring in said document, and for each property further capturing the property name, property value as either a reference to an object within the same document or a data value; and, whether the property is a composite; and,
  c. composite owner, if any, of said object.

24. A storage medium encoded with machine-readable computer program code for comparing two XMI-based XML documents, wherein, when the computer program code is executed by a computer, the computer performs the steps of:
  a. parsing each of said documents to create for each a semantic graph of the document's objects;
  b. reading a list of names of properties of said objects having significant order;
  c. for each of said objects, and then for each object's property not listed as having significant order, sorting values of said property; and,
  d. comparing objects of said semantic graphs.

25. The storage medium as in claim 24 wherein said step of sorting values of said property further includes the step of assigning a unique qualified name to each object in each of said semantic graphs.

26. The storage medium as in claim 25 wherein said step of assigning a unique qualified name is based on the sorted position of each object in the composition structure of each of said semantic graphs.

27. The storage medium as in claim 24 herein said step of comparing objects in said two semantic graphs further includes returning the result of said step of comparing.

28. The storage medium as in claim 24 wherein said step of sorting values of said property not having significant order, further includes the step of sorting said values of said property based on their data value where said value is in fact a data value.

29. The storage medium as in claim 24 wherein said step of sorting values of said property not having significant order further includes the step of sorting said values based on referenced objects where said values are references to objects.

30. The storage medium as in claim 29 wherein said step of sorting values of said property where said values are references to objects further includes sorting based on type of said referenced objects.

31. The storage medium as in claim 29 wherein said step of sorting values of said property where said values are references to objects further includes sorting based on number of properties of said referenced objects.

32. The storage medium as in claim 29 wherein said step of sorting values of said property where said values are references to objects further includes sorting based on the property name/value pairs of properties with data values.

33. The storage medium as in claim 29 wherein said step of sorting values of said property where said values are references to objects further includes sorting based on the composition depth of said referenced objects.

34. The storage medium as in claim 29 wherein said step of sorting values of said property, where said values are references to objects, further includes sorting based on the composite owner of said referenced objects, thereby further sorting said values based on referenced objects, recursively for objects referenced by referenced objects.

35. The storage medium as in claim 29 wherein said step of sorting values of said property, where said values are references to objects, further includes sorting based on referenced objects of properties specified as having significant order, thereby further sorting said values based on referenced objects, recursively for objects referenced by referenced objects.

36. The storage medium as in claim 29 wherein said step of sorting values of said property, where said values are references to objects, further includes sorting based on referenced objects of properties not specified as having significant order, thereby further sorting said values based on referenced objects, recursively for objects referenced by referenced objects.

37. The storage medium as in claim 24 wherein said step of comparing objects of said semantic graphs further comprises the step of determining whether or not said objects are of the same type.

38. The storage medium as in claim 24 wherein said step of comparing objects of said semantic graphs further comprises the step of determining whether or not said objects have the same number of properties.

39. The storage medium as in claim 38 wherein said step of comparing objects of said semantic graphs further comprises comparing each property of the first one of said objects with corresponding property of the second one of said objects.

40. The storage medium as in claim 38 wherein said step of comparing each property of the first one of said objects with corresponding property of the second one of said objects further includes comparing property names.

41. The storage medium as in claim 38 wherein said step of comparing each property of the first one of said objects with corresponding property of the second one of said objects further includes comparing types of property values.

42. The storage medium as in claim 38 wherein said step of comparing each property of the first one of said objects with corresponding property of the second one of said objects further includes, where property values are data values, comparing said data values.

43. The storage medium as in claim 38 wherein said step of comparing each property of the first one of said objects with corresponding property of the second one of said objects further includes, where property values are references to objects, comparing unique qualified names of said referenced objects.

44. The storage medium as in claim 38 wherein said step of comparing each property of the first one of said objects with corresponding property of the second one of said objects further includes, where property values are composite references to objects, comparing said referenced objects thereby repeating step d of claim 25 recursively.

45. The storage medium as in claim 24 wherein said step of comparing objects of said semantic graphs further comprises the step of, where any of said objects compare as unequal, returning an indication that said documents are unequal; and where all of said objects compare as equal, returning an indication that said documents are equal.

46. The storage medium as in claim 24 wherein said step of parsing further comprises capturing the following for each object in each one of said semantic graphs:

a. type name of said object;

b. a list of property values in the order occurring in said document, and for each property further capturing the property name, property value as either a reference to an object within the same document or a data value; and, whether the property is a composite; and, c. composite owner, if any, of said object.

* * * * *